United States Patent
Mattox

(10) Patent No.: US 6,313,785 B1
(45) Date of Patent: Nov. 6, 2001

(54) DUAL DETECTION PROCESSING FOR DETECTING SIGNALS WITH HIGH ACCELERATION UNCERTAINTY

(75) Inventor: Barry G. Mattox, Orlando, FL (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/559,664

(22) Filed: Apr. 28, 2000

(51) Int. Cl.[7] .................................................. G01S 13/536
(52) U.S. Cl. ...................... 342/106; 342/109; 342/115; 342/192; 342/196
(58) Field of Search .................... 342/90, 98, 101, 342/106, 109, 115, 135, 159, 162, 192, 194, 196

(56) References Cited

U.S. PATENT DOCUMENTS

| | | | |
|---|---|---|---|
| 3,885,240 | * 5/1975 | Jensen | 342/106 |
| 3,936,825 | * 2/1976 | Jensen | 342/106 |
| 4,774,518 | 9/1988 | Fukuhara | 342/389 |
| 5,091,729 | 2/1992 | Cantwell et al. | 342/90 |
| 5,113,194 | * 5/1992 | Krikorian et al. | 342/106 |
| 5,257,211 | 10/1993 | Noga | 364/571.04 |
| 5,337,053 | 8/1994 | Dwyer | 342/90 |
| 5,402,131 | * 3/1995 | Pierce | 342/194 |
| 5,508,706 | * 4/1996 | Tsou et al. | 342/192 |
| 5,515,300 | * 5/1996 | Pierce | 702/190 |
| 5,563,604 | * 10/1996 | Brandao et al. | 342/159 |
| 5,594,451 | 1/1997 | Krikorian et al. | 342/160 |
| 5,736,956 | 4/1998 | Kennedy et al. | 342/90 |
| 5,798,729 | 8/1998 | Scholz | 342/189 |
| 5,818,371 | 10/1998 | Lu et al. | 341/122 |
| 5,872,816 | 2/1999 | Parr et al. | 375/341 |

* cited by examiner

Primary Examiner—John B. Sotomayor
(74) Attorney, Agent, or Firm—Burns, Doane, Swecker & Mathis, LLP

(57) ABSTRACT

Dual path detection processing in which a low SNR signal processor detects signals over a limited range of low acceleration values and a high SNR signal processor detects signals over a wider range of acceleration values. The low SNR signal processor uses acceleration bins formed from a noncoherent FFT array to detect low SNR signals of far away objects which tend to have lower angular acceleration. Because close proximity target objects tend to have higher SNR return signals, it is not necessary to rely on acceleration bins formed from an FFT array for signal detection. Close proximity targets with high SNR can often be detected in individual coherently integrated FFT templates, despite the likelihood of large acceleration uncertainty from higher angular acceleration rates. Since signal detection of higher SNR signals is much less computationally burdensome than signal detection using a noncoherent FFT array, the present inventor is able to realize computational efficiencies by using dual path detection processing.

6 Claims, 4 Drawing Sheets

DUAL DETECTION PROCESSING FOR DETECTING SIGNALS WITH HIGH ACCELERATION UNCERTAINTY

The present application is related to application Ser. No. 09/559,666 entitled "Noncoherent Integrator for Signals with High Acceleration Uncertainty" which is filed on even date herewith, the disclosure of which is herein incorporated by reference in its entirety.

BACKGROUND OF THE INVENTION

1. Field of the Invention

This invention involves an improved method and apparatus of signal processing for radar systems. In particular, the present invention pertains to dual path radar signal processing in which high SNR radar return signals are coherently integrated for signal detection and low SNR signals are coherently integrated by fast Fourier transforms and additionally noncoherently integrated for signal detection.

2. State of the Art

Radar systems transmit signals and detect echos reflected from distant target objects to detect the target objects. Detection of a target object includes, for instance, determining the position, direction of movement, velocity and acceleration of target objects. Radar systems typically transmit signals of predetermined frequencies in the form of pulses or waveforms transmitted at varying frequencies. Transmitted radar waveforms of varying frequency can be used to implement linear frequency modulated chirp pulses or some such signal encoding schemes. The transmitted signals can vary in frequency, for example, from the megahertz range up to light wave frequencies in the visible spectrum. Conventional radar systems can have a co-located transmitter and receiver, or can have a transmitter and receiver located at different positions.

Signal strength is important in discerning information about a target object. Because the signal strength of the return signal varies inversely to the fourth power with the distance R between the radar system and the target ($1/R^4$), the signal strength of a return signal tends to be weak in comparison to the transmitted signal. In a addition to the distance between the radar system and the target, signal strength and quality are also affected by radar parameters and target variables. Radar aperture, transmit power and amplifier efficiencies are examples of radar parameters which affect a radar system's target detection ability. Likewise, target size, shape, target object material, and target velocity/acceleration, also affect the return signal strength and signal quality. For instance, as target objects, missiles can be especially challenging to detect because they tend to be fast moving, small, targets With a high degree of acceleration uncertainty. In addition, as radar return signals diminish to the level of background noise they tend to be very difficult to detect.

Signal processing can be used to detect weak radar return signals, and to discern the Doppler characteristics of return signals for determining position, velocity and acceleration of the target object. As the signal-to-noise ratio (SNR) decreases, signal processing becomes more important for signal detection. Signal processing also becomes more computationally burdensome as the return signal SNR becomes smaller, since the return signal blends into the background noise. In general, low SNR signals with fewer unknown variables are easier to detect than low SNR signals with more unknown variables. For example, signals having a known acceleration value are easier to detect than signals with an unknown acceleration component.

In order to reduce the unknown variables of return signals and thus enhance signal processing, radar systems typically transmit coherent radar signals. Signal coherence means that the phase is continuous from one transmitted signal to the next, is if the signals were chopped out of the same continuous waveform. Having a known value or expected range of signal phase allows return signals to be more readily manipulated during signal processing and detection. By using coherent signals, radar systems can detect Doppler shifts due to changes in relative velocity between the radar system and the target object.

Signal processing generally involves coherent integration to transform return signals from the time domain to the frequency domain. Typically, a fast Fourier transform (FFT) filter is used for the coherent integration. Signal processing can then be used to analyze the received return signals once they are represented in frequency domain form. However, even for frequency domain analysis, conventional radar systems require that the return signals have sufficient signal strength.

FIG. 1A is an FFT frequency domain representation of a received signal. The FFT shown in FIG. 1A indicates the relative velocity between the radar system and the target object. Target objects with higher velocities relative to the radar system have higher frequencies, and are shown shifted to the right. Target objects moving more slowly relative to the radar system have lower frequencies, and are shown shifted to the left.

By analyzing the FFTs corresponding to different time segments, changes in target velocity can be determined. Detecting target velocity changes within different time segments allows an approximation of acceleration to be made. However, to make such an approximate acceleration determination using a conventional radar signal processor, the received signal must be strong enough for detection in each FFT. If the SNR is too low for target detection of individual FFTs, lo velocity comparison can be made for determining acceleration.

In conventional radar systems, signal processing can be used to detect return signals and determine an unknown target acceleration for return signals characterized by high SNR. Conventional radar systems may also be able to detect the presence of return signals characterized by low SNR, but only if the acceleration component of the return signal is known.

SUMMARY OF THE INVENTION

The Applicants recognize that if acceleration is unknown for low SNR signals, the computational complexity of signal processing becomes much more extensive, to the extent of being beyond the computational capabilities of today's technology. The Applicants identify a drawback of conventional radar systems as being the inability to detect low SNR return signals of unknown acceleration over a wide acceleration range because of the computational burdens of signal processing.

The present invention reduces the computational burdens associated with processing return signals of unknown acceleration and having low SNRs. The present invention provides a more efficient way of performing the operation of noncoherent integration.

Generally speaking, exemplary embodiments are directed to signal processing using a dual path signal processor. Close proximity targets tend to have high SNR values and also tend to have high angular acceleration components. Far away targets tend to have low SNR and lower angular acceleration. The detection of far away, low SNR targets may be achieved by forming a noncoherent FFT array matrix having acceleration bins. But such use of acceleration bins is computationally burdensome. Since close proximity targets tend to be higher in SNR, only the low acceleration, low SNR targets need be detected by using the more extensive processing that employs acceleration bins. The close proximity targets, which tend to have higher SNR values, can be detected within individual FFT templates. By using dual path signal processing according to the present invention, the signal processor detects signals with unknown acceleration components without an unduly burdensome computational load for the signal processor.

The present invention is directed to a signal processing method and system for detecting target objects. According to one embodiment of the signal detection method, electromagnetic signals are received which include target object signals of unknown velocity and acceleration. Target object signals from far away target objects tend to have smaller acceleration components than target object signals from close proximity target objects. The received signals are coherently integrated to transform them from the time domain segments into frequency domain templates of data. The templates are then arranged into an array matrix, and acceleration bins are formed. The acceleration bins can be analyzed to detect the presence of a target object signal. Since formation of acceleration bins requires significant processing resources, the present invention forms and analyzes only acceleration bins having low acceleration. Then the present invention periodically analyzes individual templates for the presence of target object signals having high SNR. The individual templates may be analyzed for a relatively wider range of high target object acceleration values.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1A:
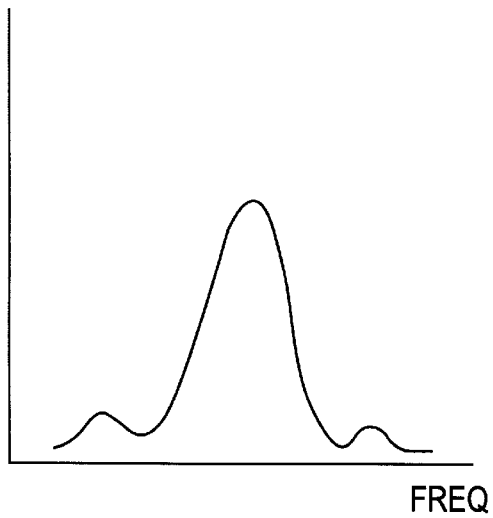
FIG. 1A is an FFT frequency domain representation of a received signal.
Figure 1B:
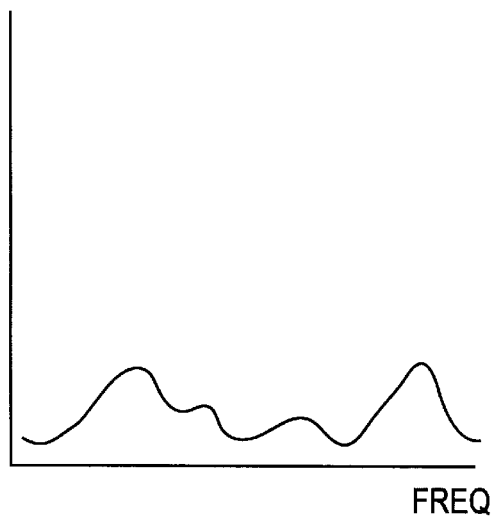
FIG. 1B is an FFT frequency domain representation of a noisy received signal.

FIG. 1B is a frequency domain representation of a noisy received signal. Signal processing through a process of coherent integration or frequency domain transformation may be used to transform received signals from the time domain into a frequency domain representation. The coherent integration is commonly achieved through use of a Fourier transform filter or a fast Fourier transform (FFT) filler. To simplify the explanation of the present invention, the concept of coherent integration or frequency domain transformation is referred to as FFT processing, or simply as FFT. Other equivalent methods of frequency domain transformation or coherent integration may also be used with the present invention, such as optical Fourier transforms, filter banks, or like methods or devices.

Once the received signals have been transformed into the frequency domain, signal processing can be used to analyze the Doppler shift of coherent signals to determine information about the target object, so long as the return signals have sufficient signal strength. The noisy received return signal FFT of FIG. 1B characterized by a low ratio of the signal strength to the interference level, illustrates problems which can arise when trying to detect a reflected signal having a low SNR, that is, a signal which is not much stronger than the background noise. As can be seen in the figure, it is unclear whether the first peak, the second peak, or both, are return signals. In a relatively noisy environment with high levels of interference, it may be that both the peaks of FIG. 1B are merely noise spikes or some other form of interference rather than return signals. Efforts to detect low SNR return signals often result in unacceptably high false detection rates.

Optimally, a signal to be detected will have a much stronger signal strength than the surrounding noise and interference. However, even a high SNR return signal with strong strength can result in detection problems. For instance, strong signals may be accompanied by spurious harmonic signals. Such harmonics may themselves be falsely detected as signals.

Figure 1C:
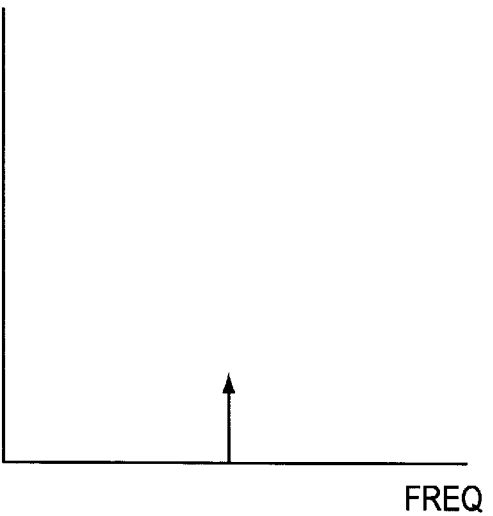
FIGS. 1C and 1D are simplified conceptual representations of the FFTs of FIGS. 1A and 1B.
Figure 1D:
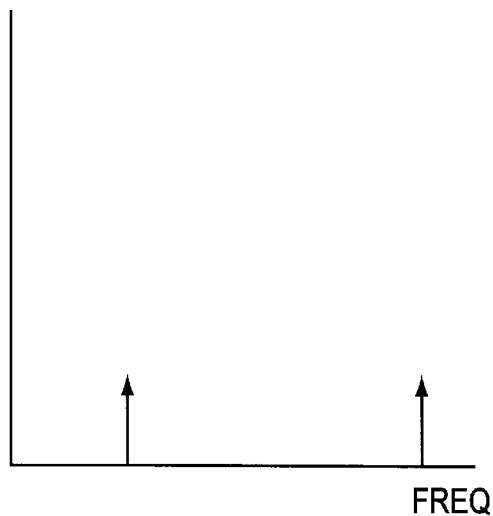

FIGS. 1C and 1D are simplified conceptual representations of the frequency domain representation, or FFTs, of FIGS. 1A and 1B. A single frequency domain representation corresponding to a particular time segment of the receive signal, as shown in FIGS. 1C and 1D for example, may be referred to as an FFT template or simply as an FFT. An FFT template can be depicted as a row of numbers or units of data, with each number or unit of data representing the strength of a return signal and/or noise component at a given frequency. The individual units of data forming an FFT template are called FFT lines.

Figure 2A:
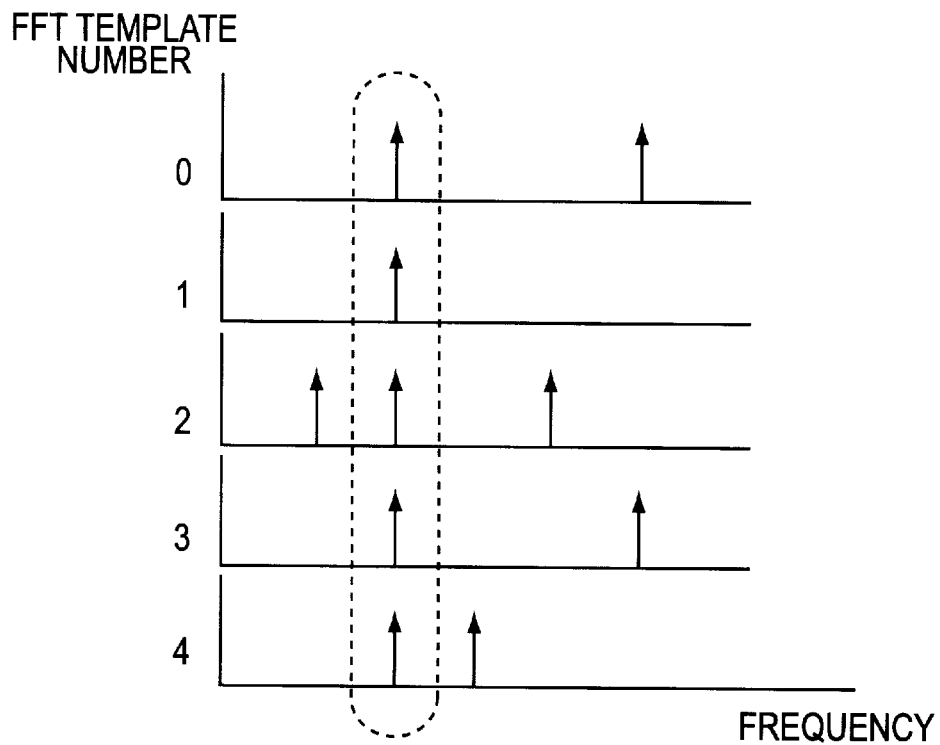
FIG. 2A is an FFT array matrix containing a constant velocity signal and random noise.

FIG. 2A is an FFT array matrix containing a constant velocity signal, along faith random noise. The FFT array matrix, known simply as an array, is constructed by aligning and stacking various FFT templates transformed from different time segments of the received signal. The process of aligning and stacking the various FFT templates is a preliminary to noncoherently adding the FFT templates. The array is noncoherent in the sense that phase data pertaining to the return signals is discarded since phase decorrelates for times longer than the coherency time. This is normally accomplished by taking the magnitude squared of each FFT line.

Use of such an array for detection of low SNR signals of unknown acceleration does not result in excessive time delay so long as the delay due to noncoherent integration is considerably shorter than the observation time allowed for making a detection decision. Making use of the total allowable observation time to obtain the most reliable detection decision requires the noncoherent integration of intermediate results of coherently integrated segments of the return signal. For example, if the coherency time for a return signal from a missile is 100 microseconds and as much as 100 milliseconds of observation time is allowed, then 1,000 products of coherent integrations (i.e., 1,000 of the 100 microsecond segments) can be noncoherently integrated.

The fast fourier transform of a particular time segment of the return signal is reflect ed as an FFT template (horizontal row) in the FFT array. A large number in the row indicates the presence of a signal (or a noise spike perceived to be signal). The horizontal axis in an FFT array corresponds to Doppler frequency which is an indication of target velocity. Signals towards the left end of a template have lower target velocities than signals towards the right end. Signals of different FFT templates which are in the same vertical column have the same frequency, and thus have the same target velocity. Therefore, FFT array columns represent velocity bins or velocity gates. The array comprises a number of adjacent velocity bins corresponding to the columns of the array.

Each row of the FIG. 2A array constitutes an FFT template for a different time segment of a received signal. By arranging multiple FFTs from various time segments into an FFT array, further signal processing can be used to detect signals at low signal strength levels relative to the level of interference. Statistics can be used if determining whether or not a signal is present. Statistical analysis for signal detection involves determining whether there is a trend of the same signal being present in a number of different FFT templates. For example, the return signal of a constant velocity target would be expected to appear in an FFT array velocity bin as a vertical column of FFT lines containing the signal, as shown in FIG. 2A. If the constant velocity return signals have low SNR, the signal component of the velocity gate for individual FFTs may not be apparent. However, the data from the multiple FFTs can be statistically analyzed to determine whether or not a target is present. The process of summing FFT lines from different FFT templates for statistical analysis and signal processing is referred to as noncoherently adding the FFT lines, since phase data of the signals has been discarded.

Figure 2B:
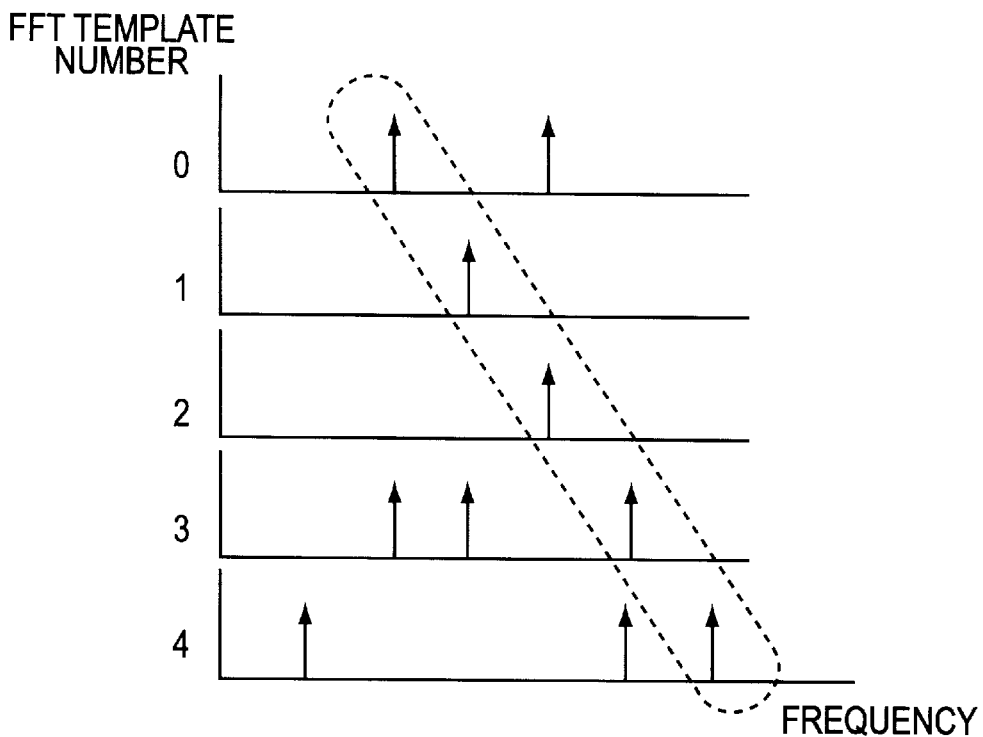
FIG. 2B is an FFT array matrix containing a signal with a constant acceleration component, and random noise.

FIG. 2B is an FFT array containing a signal with a constant acceleration component, and random noise. A return signal with an acceleration component shows up in different velocity bins of the various FFT templates making up an array. That is, a signal with an acceleration component, by definition, is characterized by velocity which varies over time. Therefore, for subsequent FFT templates (rows), the signal appears to move across the velocity bins (columns). In other words, an accelerating signal "walks" across various velocity bins from one FFT template of the array down to the next. Higher acceleration components are characterized by greater walk rates.

A walk rate produces a signal with an acceleration slope. Signals with small acceleration components—that is, which are nearly constant in velocity—walk across Relatively few velocity bins and appear nearly vertical. The greater the acceleration, the more velocity bins the signal walks across and the more the slope flatten out, tending towards horizontal. In the context of the present disclosure, the term "acceleration" is defined to be either a positive acceleration or a negative acceleration, in either absolute terms or terms of relative movement between the target and the radar system. Thus, a signal from a target which is either accelerating or decelerating is thought of as having an acceleration component. Note that a target which is decelerating has a negative acceleration slope. A decelerating target appears to trend downward and to the left of an FFT array.

To detect a signal with an unknown acceleration component, the templates along each possible acceleration slope should be noncoherently added and signal processed. Typically, neither acceleration nor velocity is known beforehand for a target. Therefore, for a return signal having unknown acceleration and velocity, all the resolvable acceleration slopes must be evaluated for each velocity bin—not merely for the first velocity bin. That is, detection of a low SNR signal of unknown acceleration entails analyzing all acceleration slopes for each velocity bin of the array. Thus, each acceleration slope would be evaluated for velocity bin 0, then each acceleration slope would be evaluated for velocity bin 1, and so on, up through all velocity bins of the array.

To detect a signal with acceleration uncertainty using conventional "brute force" processing methods would require an enormous volume of computations. The ability to perform such brute force computations is beyond the computational capabilities of present systems. Thus, low SNR signals with acceleration uncertainty require signal processing which is not feasible according to conventional methods or the capabilities of conventional signal processors.

The following relationships define the processing load required for noncoherent integration of low SNR return signals with acceleration uncertainty. Velocity resolution is the degree of accuracy in detecting a target's velocity, and corresponds to the width of each velocity bin. The velocity resolution $\delta v$ is inversely proportional to the coherent integration time T. The velocity resolution $\delta v$ can be described by the equation:

$$\delta v = \lambda/(2T) \quad (1)$$

In equation (1), $\delta v$ is the velocity resolution, $\lambda$ is the wavelength of the return signal, and T is the coherent integration time.

Velocity uncertainty $\Delta v$, which is the range of possible velocities that a signal processor is able to detect, corresponds to the width of the FFT array. Ideally, the velocity uncertainty $\Delta v$ represents the range of velocities that a return signal is likely to have. The number of velocity bins M is determined by dividing the velocity uncertainty $\Delta v$ by the velocity resolution $\delta v$:

$$M = \Delta v/\delta v \quad (2)$$

In equation (2), M is the number of velocity bins, $\Delta v$ is the velocity uncertainty, and $\delta v$ is the velocity resolution.

Acceleration resolution is the degree of accuracy in detecting a target's acceleration. To determine the acceleration resolution $\delta a$, the velocity resolution $\delta v$ is divided by the total dwell time, $T_{total}$:

$$\delta a = \delta v/T_{total} \quad (3)$$

In equation (3), $\delta a$ is the acceleration resolution, $\delta v$ is the velocity resolution, and $T_{total}$ is the total dwell time.

The range of acceleration values which a radar signal processor can detect is known as acceleration uncertainty $\Delta a$. In setting up a signal processor, an acceptable parameter for the acceleration uncertainty $\Delta a$ must initially be chosen. The number of acceleration bins $N_A$ is the acceleration uncertainty $\Delta a$ divided by the acceleration resolution $\delta a$:

$$N_A = \Delta a/\delta a \quad (4)$$

In equation (4), $N_A$ is the number of acceleration bins, $\Delta a$ is the acceleration uncertainty, and $\delta a$ is the acceleration resolution. If $\Delta a$ is restricted to a value such that the velocity changes are at most one FFT bin during a coherent integration time, then $\Delta a T \leq \delta v$. This prevents significant coherent integration loss. With this constraint, the number of FFTs is $N_{FFT} \geq N_A$.

The number of computations $n_c$ required for brute force computation of the acceleration integrations for all of the velocity bins is the number of velocity bins M multiplied by the number of acceleration bins $N_A$ multiplied by the number of FFTs to add:

$$n_c = M \, N_A N_{FFT} \geq MN_A^2 \tag{5}$$

In equation (5), $n_c$ is the number of computations required, M is the number of velocity bins, $N_A$ is the number of acceleration bins, and $N_{FFT}$ is the number of FFTs to be added.

For a processor to perform the computations in real-time, the processor would have to compute at a rate of:

$$n_c/T_{total} \geq MN_A^2/T_{total} \tag{6}$$

In equation (6), $n_c$ is the number of computations required, $T_{total}$ is al is the total time for the computations, M is the number of velocity bins, and $N_A$ is the number of acceleration bins.

By way of illustration, an 11.2 micron laser may typically have a velocity uncertainty of 3,000 meters/second, an acceleration uncertainty of 140 meters/second$^2$, a 100 microsecond coherent integration time, and a 100 millisecond total integration time. For these values, $\delta v$=0.056 m/s, $\delta a$=0.56 m/s$^2$, M=53,570, and $N_A$=256, resulting in $n_c$=5.5× 10$^8$. Using conventional brute-force processing would require a real-time processing capability of:

$n_c/T_{total}$=3.51×10$^{10}$=35.1 gig-operations/second (GOPS). According to conventional signal processing technology, a rate of processing of 35.1 GOPS is probably not feasible. Even if computation at this rate was possible it would be prohibitively expensive.

The above computational burdens apply when low SNR return signals are characterized by unknown or uncertain acceleration. To ensure detection of low SNR signals with acceleration uncertainty the acceleration bins of the range of possible accelerations should be noncoherently formed and processed. Return signals are easier to detect if there is sufficient SNR, or if the acceleration component is known. If the target object return signal is strong enough to detect within a single FFT template, there is no need for FFT array signal processing of various noncoherently formed acceleration bins.

One way of reducing the computational burdens of signal processing a low SNR return signals of unknown acceleration is by using the binary branching technique disclosed in copending U.S. patent application Ser. No. 09/559/665 entitled "Noncoherent Integrator for Signals with High Acceleration Uncertainty," herein incorporated by reference. The present invention provides another manner of reducing the computational burdens of signal processing and can be used in conjunction with the invention of the aforementioned co-pending application. The computational burdens can be further reduced through the selective use of FFT arrays. According to the present invention, FFT arrays need not be used to detect return signals having sufficient SNR. Thus, target objects having large accelerations (which tend to be computationally burdensome if processed using FFT arrays) will usually have sufficient SNR to be detected directly from individual FFT templates. Therefore, a signal detection scheme which examines individual FFT templates for signal presence, and also uses FFT arrays for signal processing, can be less computationally burdensome. The present invention realizes efficiencies by reducing, the number of acceleration bins to be analyzed for return signals having low SNR which cannot be detected in individual FFT templates.

Target objects close to the radar system tend to have higher SNR return signals associated with them than more distant targets. In addition, close proximity target objects also tend to have higher angular acceleration components, with the exception of close target objects moving directly towards or away from the radar system. Because close proximity target objects have higher SNR return signals it is not necessary to rely on acceleration bins within an FFT array for signal detection, even though close proximity target objects tend to have more acceleration uncertainty due to higher angular accelerations. In other words, a close proximity target object having high SNR return signals can often be detected in an individual coherently integrated FFT template, despite the likelihood of large acceleration uncertainty due to a higher angular acceleration component. Therefore, the detection scheme of the present invention analyzes individual FFT templates for the presence of target object return signals and also noncoherently forms arrays with a reduced number of acceleration bins to detect the more distant target objects.

In contrast to close proximity target objects, return signals from far-away target objects tend to have less angular acceleration associated with them. Far-away target objects also usually have lower SNRs because of the greater distance between the radar system and the target object. Thus, far-away target objects of unknown acceleration still require noncoherently formed FFT arrays having acceleration bins for signal detection. The present invention exploits the fact that angular acceleration tends to be lower for far-away target objects by using a reduced number of acceleration bins. The reduced number of acceleration bins can significantly decrease the computational burdens associated with noncoherently formed FFT array radar signal processing.

Figure 3:
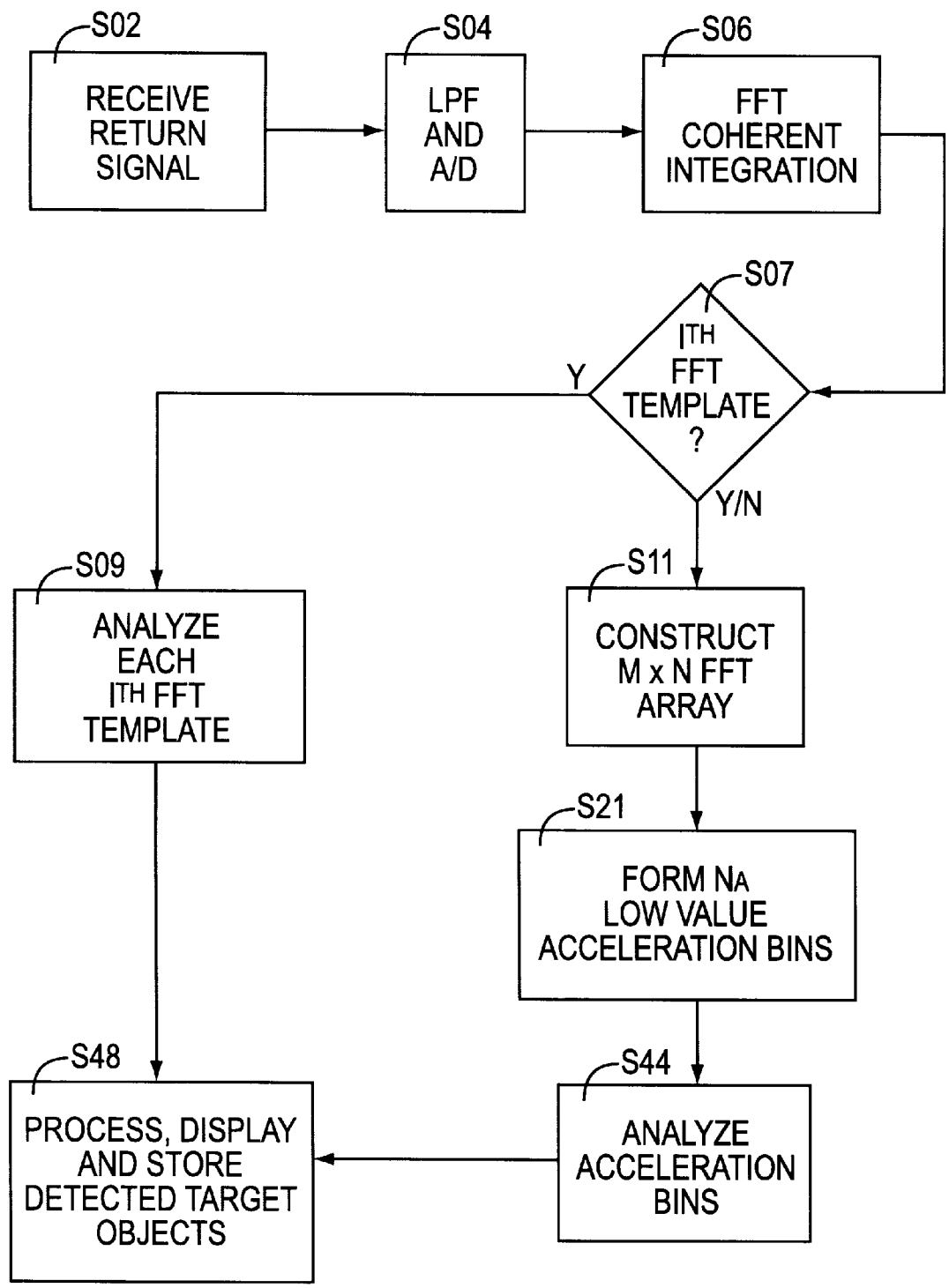
FIG. 3 is a flow chart illustrating dual detection signal processing, according to the present invention.

FIG. 3 is a flow chart illustrating dual detection signal processing, according to the present invention. A return signal reflected from a target object is received at step S02 by a receiver. The specific configuration of the receiver depends upon the nature of the signal being transmitted and/or received. Typically, a receiver consists of one or more detectors, antennas, or other apertures, often in conjunction with a feed network and low noise amplifiers. In step S04 the received return signal is processed through an anti-aliasing low pass filter, and then A/D converted from an analog waveform to a digital time-series signal. The A/D conversion is typically performed using an analog-to-digital converter unit (ADC) or other form of A/D circuitry.

At step S06, the return signal is fast Fourier transform (FFT) processed to convert digital time-series return signals into a frequency domain representation. In the present context, a frequency domain representation is called an FFT template, and consists of a number M of FFT lines. According to an exemplary embodiment of the present invention, each of the M FFT lines corresponds to a particular doppler frequency range. Thus, each of the M FFT lines within an FFT template are associated with a particular velocity bin. In alternative embodiments of the present invention, a velocity bin can consist of more than one FFT line. The number of FFT lines per velocity bin—that is, the frequency range per velocity bin—depends, for instance, on the velocity resolution requirements and the processing resources available for the radar system. If the received signal is a radar return signal, the FFT transformation of step S06 is often referred to as coherent integration, since, in general, radar signals are coherently transmitted. Coherently integrating a particular time segment of return signal results in M number of FFT lines, with most of the target energy concentrated in a single or a few FFT lines. In practice, it is preferable to use coherent integration to the maximum extent allowed by the coherency time of the signal to be detected. According to a preferred embodiment of the present invention, the FFT processing of step S06 uses a Hamming window FFT. Alternatively, a Hanning window, Blackman window, rectangular window, or the like could be used for the coherent integration of step S06.

The signal processing steps of the present method are preferably continuously executed. That is, as a step is being performed on a return signal, other processing steps are also being performed on later and/or earlier return signals. For instance, at the same time one return signal is being received in step S02, a Previously received return signal is undergoing front-end processing in step S04 while a return signal received earlier yet undergoes coherent integration in step S06, and so on. To achieve this, the radar signal processor preferably has one or more memories for storing signals in various stages of being processed.

In step S07 the FFT templates are counted. Every Ith FFT template is forward to step S09 to be analyzed for the presence of target object signals. The variable I can be set to any value of one or more ($I \geq 1$). In the case where I equals one, every individual FFT template is analyzed for the presence of a target object signal. The signals outputted in step S09, if any, will have been detected in the individual FFT templates formed in step S06. Therefore, signals detected in step S09 will most likely be characterized by high SNR values. The velocity bins and times of each of the detected signals from step S09 are stored for subsequent standard linear regression analysis, which results in forming an estimate of an initial velocity and a velocity slope, which is the acceleration.

In step S11 each of the FFT templates are signal processed and arranged to noncoherently form an FFT array. The details pertaining to the formation and analysis of noncoherent FFT arrays are disclosed in further detail in copending U.S. patent application Ser. No. 09/559,665 entitled "Noncoherent Integrator for Signals with High Acceleration uncertainty," herein incorporated by reference. To noncoherently form an FFT array, a number of FFT templates, for instance, N, are counted for forming an M×N FFT array. The "N" FFT templates are then aligned so that corresponding FFT lines in successive FFT templates will have the same frequency. Since frequency within an FFT array corresponds to target velocity, frequency alignment enables the formation of velocity bins within the FFT templates. Once the frequencies of FFT templates have been aligned, the FFT templates can be stacked, forming an FFT array. The FFT templates should preferably be arranged from top to bottom in the order of return signal arrival time. The FFT templates form the rows of an array. Each column of an FFT array contains FFT lines having the same frequency. Thus, the FFT array columns form velocity bins, also known as velocity gates. The formation of an FFT array is known as noncoherent integration, since phase is not used in stacking the FFT templates. Phase is discarded because phase decorrelates for lengths of time greater than the coherency time of the radar signal. Step S11 results in the formation of an M×N FFT array.

In step S21 the acceleration bins are formed. According to the present invention, it is recognized that return signals from far-away target objects tend to have less acceleration uncertainty, in addition to being characterized by low SNR. The relatively less acceleration uncertainty is a result of smaller angular acceleration components being associated with far-away target objects as opposed to close proximity target objects.

The present invention exploits the lower acceleration uncertainty to reduce the computational complexity of radar signal processing, by generating fewer acceleration bins within the noncoherent FFT array. Forming fewer acceleration bins according to the present invention results in a percentage reduction of the noncoherent FFT array computational requirements outlined in equation (5). For example, assuming the processing requirements of forming each acceleration bin to be the same, the formation of 256 acceleration bins would require only 25% of the signal processing computational resources as would be required to form 1,024 acceleration bins. If the presumming technique described in copending U.S. patent application Ser. No. 09/559,665 is applied, the processing requirements to form 256 acceleration bins would be reduced to 20% of the resources required to form 1,024 bins.

In practice the formation of an acceleration bin having a high rate of acceleration requires more computational resources than the formation of an acceleration bin with a low acceleration rate. This disparity of computational resources for forming acceleration bins results from the reduced number of allowable FFTs presummed to reduce the amount of data in the FFT array (see copending U.S. patent application Ser. No. 09/559,665. Target signals having a high rate of acceleration are characterized by a high "walk rate" across the velocity bins of an FFT array and thus allow fewer FFTs to be presummed than signals with low rates of acceleration. Therefore, by avoiding the need to form acceleration bins for the high rates of acceleration, the present invention results in relatively higher computational efficiency gains than the percentage reduction in the number of acceleration bins formed. Acceleration bins may be formed by any known signal processing method, but are preferably formed by the novel binary branching method of copending U.S. patent application Ser. No. 09/559,665, entitled "Noncoherent Integrator for Signals with High Acceleration Uncertainty," herein incorporated by reference.

Once the acceleration bins have been formed in step S21, the method then proceeds to step S44 where the reduced number of acceleration bins $N_A$ is analyzed for the presence of a target object return signal. Since $N_A$ is less than the total possible number of resolvable acceleration bins, the present invention results increased computational efficiency for detecting radar signals. Upon analyzing the $N_A$ number of acceleration bins in step S44, the method proceeds to step S48 where any detected signals are outputted for further signal processing or for display. In step S48 any target object signals detected in either steps S09 or in step S44 are subjected to post-detection processing for display, analysis and storage purposes.

Figure 4:
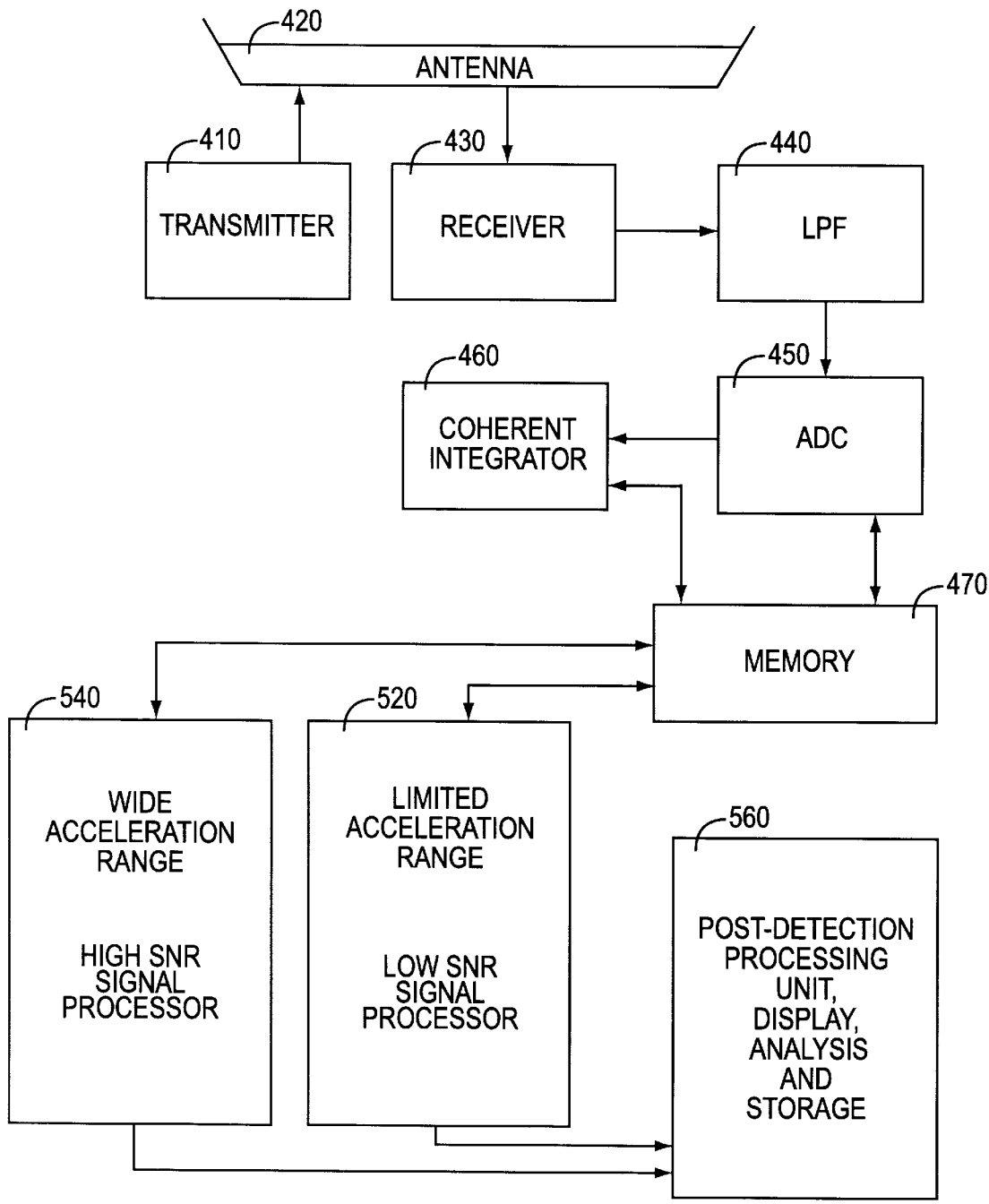
FIG. 4 depicts a radar system for dual detection processing of signals with acceleration uncertainty, according to the present invention.

FIG. 4 depicts a radar system for dual detection processing of signals with high acceleration uncertainty, according to the present invention. Signals are transmitted from transmitter 410, which can either use a dedicated transmitter antenna or an antenna 420 shared with a receiver 430 of the radar. Return signals reflected from a target object are received at the receiver 430 via the antenna 420. The received signals are low pass filtered and A/D converted by a LPF 440 and an ADC 450, respectively. Upon being A/D converted, the digital signals are then transformed into the frequency domain in coherent integrator 460, to form FFT templates of the return signals. The coherent integrator 460 may be a fast Fourier transform filter.

During various stages of signal processing, signal manipulation and computation, signals can be saved, stored and retrieved in memory 470. Signal process 520 discards the signal phase, performs presumes, and forms an FFT matrix o the FFT templates. The signal processor 520 also forms a number of acceleration bins over a reduced range of acceleration. A reduced number of acceleration bins can be formed since distance target objects having low SNR also tend to have lower angular rates of acceleration. Thus, present invention uses a reduced number of acceleration bins formed from a noncoherent FFT array matrix for only the low SNR signals. The use of relatively fewer acceleration bins reduces the computational burdens associated with detecting low level signals. Upon forming acceleration bins, the signal processor 520 analyzes the various acceleration bins to detect the presence of a target object return signal. Signal processor 540 is used to detect high SNR signals over a wider acceleration range than that associated with signal processor 520. Because close proximity target objects end to have higher SNR return signals, it is not necessary to rely on acceleration bins within an FFT array for signal detection. A close proximity target object having high SNR can often be detected in an individual coherently integrated FFT template, despite the likelihood of large acceleration uncertainty due to a higher angular acceleration component. Therefore, the signal processor 540 has a higher detection threshold and operates over a wider acceleration range than the signal processor 520. Since signal detection of higher SNR signals (e.g., signal processor 540) is much less computationally burdensome than signal detection using a noncoherent FFT array (e.g., signal processor 520), the present invention is able to realize computational efficiencies by using dual path detection processing. The detected target object signals are then sent to a post-detection unit 560 for further processing, display, and storage.

In accordance with an alternative embodiment of the present invention, the radar system may passively detect and process signals with high acceleration uncertainty. This embodiment is equipped with the elements depicted in FIG. 4, except that the passive radar system does not have a transmitter 410. Instead of detecting return signals transmitted from transmitter 410 and reflected from the target object, the passive radar system detects signals from the target object which derive from either the target object itself or are from another source and are reflected off the target object. The remaining elements depicted in FIG. 4 operate as described above.

It will be appreciated by those skilled in the art that the present invention can be embodied in other specific forms without departing from the spirit or essential characteristics thereof. The presently disclosed embodiments are therefore, considered in all respects to be illustrative and not restricted. The scope of the invention is indicated by the appended claims rather than the foregoing descript on and all changes that come within the meaning and range and equivalence thereof are intended to be embraced therein.

What is claimed is:

1. A method for detecting target objects by a signal detection system, the method comprising the steps of:

receiving electromagnetic signals at the signal detection system, the electromagnetic signals including target object signals having unknown values of velocity and acceleration, wherein a magnitude of an acceleration component corresponding to a particular target object tends to be inversely correlated to a distance between the particular target object and the signal detection system;

transforming the received electromagnetic signals from time domain data into frequency domain templates of data;

arranging the frequency domain templates into an array matrix having acceleration bins;

analyzing the acceleration bins to detect the presence of a target object signal, the acceleration values of the acceleration bins being analyzed being lower than the highest expected acceleration of the target objects; and periodically analyzing individual templates for the presence of a target object signal within the individual templates.

2. The method according to claim 1, wherein the step of transforming the received electromagnetic signals comprises coherently integrating the received electromagnetic signals.

3. The method according to claim 2, wherein the step of coherently integrating the received electromagnetic signals comprises a fast Fourier transform (FFT) operation.

4. The method according to claim 3, wherein the signal detection system is a radar system.

5. The method according to claim 4, further comprising the step of:

forming velocity bins within the array.

6. A signal detection system for detecting electromagnetic signals from target objects, the signal detection system comprising:

a receiver for receiving electromagnetic signals at the signal detection system, the electromagnetic signals including target object signals having unknown values of velocity and acceleration, wherein a magnitude of an acceleration component corresponding to a particular target object tends to be inversely correlated to a distance between the particular target object and the signal detection system;

means for transforming time domain data of the received electromagnetic signals into frequency domain templates of data; and signal processor for arranging the frequency domain templates into an array matrix having acceleration bins;

wherein the signal processor analyzes the acceleration bins to detect the presence of a target object signal, the acceleration values of the acceleration bins being analyzed having values lower than the highest expected acceleration of the target objects, and the signal processor periodically analyzes individual templates for the presence of a target object signal within the individual templates.

* * * * *